(12) United States Patent
Wimmer

(10) Patent No.: US 7,746,791 B2
(45) Date of Patent: Jun. 29, 2010

(54) MONITORING AN INDUSTRIAL COMMUNICATION NETWORK

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 811 days.

(21) Appl. No.: 11/508,308

(22) Filed: Aug. 23, 2006

(65) Prior Publication Data

US 2007/0057782 A1 Mar. 15, 2007

(30) Foreign Application Priority Data

Aug. 24, 2005 (EP) .................................. 05405491

(51) Int. Cl.
*H04L 1/00* (2006.01)
(52) U.S. Cl. ..................................... 370/242
(58) Field of Classification Search ........................ None
See application file for complete search history.

(56) References Cited

U.S. PATENT DOCUMENTS

| | | | |
|---|---|---|---|
| 6,625,745 B1 | 9/2003 | Johnson et al. | |
| 6,804,712 B1 | 10/2004 | Kracht | |
| 2003/0016629 A1 | 1/2003 | Bender et al. | |

OTHER PUBLICATIONS

McDonald, Substation Automation IED Integration and Availability of Information, IEEE, 10 pages, 2003.*

* cited by examiner

*Primary Examiner*—Frank Duong
(74) *Attorney, Agent, or Firm*—Buchanan Ingersoll & Rooney PC

(57) ABSTRACT

The present invention is concerned with the identification of a failed communication network component of an industrial communication network and of a substation automation system in particular. This is achieved by supervising communication paths of a communication network having components. A failure status or operating status of each communication path is determined and reported. Any network component that is part of an operating path is regarded as operating, i.e. failure-free, whereas all other network components are considered as non-operating or potentially failed. If there is more than one non-operating component, additional suitable communication paths are evaluated, until one single failed network component is identified and subsequently reported as requiring repair or replacement. The invention is particularly applicable in cases where some of the network components, i.e. the lines or some nodes of the communication paths, are passive components or non-intelligent devices that are unable to report an operating status themselves.

14 Claims, 1 Drawing Sheet

| component / path | N1 | L1 | N2 | L3 | N3 |
|---|---|---|---|---|---|
| D1-D4 | + | | | | |
| D1-D5 | − | − | − | − | − |
| D2-D5 | | | + | + | + |
| D2-D4 | − | − | − | | |
| D3-D4 | − | − | − | − | − |
| D3-D5 | | | | | + |
| status | + | − | + | + | + |

MONITORING AN INDUSTRIAL COMMUNICATION NETWORK

The present application claims priority under 35 U.S.C. §119 to European Patent Document No. 05405491.1, filed Aug. 24, 2005, the disclosure of which is hereby incorporated by reference in its entirety.

FIELD OF THE INVENTION

The invention relates to the field of distributed control systems for controlling industrial processes, and in particular to substation automation for high or medium voltage power substations. It specifically relates to a method of monitoring an industrial communication network comprising a single, unambiguous end-to-end communication link for each pair of end devices connected to the communication network.

BACKGROUND OF THE INVENTION

In industrial communication networks of distributed control systems, reliability or availability is a key issue, because a failing communication network generally entails an interruption of the controlling process, which might lead to a shut down of the controlled industrial process. The fast identification of a failed or otherwise inoperable component of the industrial communication network is thus important. This is particularly valid for the field of Substation Automation (SA), as the reliability of a SA system has an immediate impact on the reliability of an entire power network.

Substations for power distribution in high and medium voltage power networks include primary or field devices such as electrical cables, lines, busbars, switches, breakers, power transformers and instrument transformers. These primary devices are operated in an automated way via a Substation Automation (SA) system responsible for controlling, protecting and monitoring of substations. The SA system comprises programmable secondary devices, so-called Intelligent Electronic Devices (IED), interconnected in a SA communication network, and interacting with the primary devices via a process interface. The IEDs are generally assigned to one of three hierarchical levels, namely the station level with the operators place including a Human-Machine Interface (HMI) as well as the gateway to the Network Control Centre (NCC), the bay level with its Bay Units (BU) for protection and control, and the process level. Process level units comprise e.g. electronic sensors for voltage, current and gas density measurements as well as for switch and transformer tap changer positions, or breaker-IEDs controlling an actuator or drive of a circuit breaker or disconnector. Intelligent actuators or breaker IEDs may be integrated in the respective intelligent primary equipment and connected to a Bay Unit via a serial link or optical process bus. The BUs are connected to each other and to the IEDs on the station level via an inter-bay or station bus.

A reliable SA system is typically required to continue to be operable even if a component fails, i.e. a single point of failure that causes the substation to become inoperable is unacceptable. A failure of a component of the SA communication network, due to e.g. a loss of a communication port caused by a failing diode for a fibre optic link, can result in the loss of access to the complete substation, one single bay or only one IED. Albeit the failure rate of the electronic ingredients of an individual IED is already very low, redundancy is one way to increase reliability of the SA system. Redundancy can be achieved by doubling components, or by benefiting from an inherent redundancy of a ring-type communication link. Even in such redundant SA communication networks, it is important to detect errors or failed components, in order to repair or replace the component and re-establish the vital redundancy. Hence, of all the components of the SA communication network, including IEDs, Ethernet switches, Ethernet lines, fibre-optical lines, hubs and opto-electrical star couplers, it is important to know the availability, in other words, a failure of a component has to be localized and diagnosed as quickly as possible in order for a repair or replacement to be arranged for.

In SA communication networks based on the novel Standard IEC 61850, the use of fibre optics and switches overcomes some limitations of the Ethernet like collisions and allowed length extensions. However, opto-electrical star-type couplers working exclusively with electro-optical conversion on a physical level, Ethernet hubs working exclusively with electrical connections, as well as all interconnecting physical lines, are passive components deprived of any intelligence or programmability.

In industrial communication networks with intelligent or active devices such as routers or Ethernet switches, these devices can themselves identify as being out of order or otherwise in need of maintenance. The result of such as self-diagnosis is then transmitted by means of dedicated protocols such as the Simple Network Management Protocol (SNMP) to a monitoring device for evaluation. SNMP is the Internet standard protocol developed to manage nodes (servers, workstations, routers, and switches etc.) on an IP network. The protocol can support monitoring of intelligent network-attached devices for any conditions that warrant administrative attention. However, the particular data transmitted is often device-specific and can only be interpreted correctly by communication experts. In addition, and unless supplemental intelligence is provided for monitoring passive or non-intelligent components, a failure of the latter cannot be identified this way.

DESCRIPTION OF THE INVENTION

It is therefore an objective of the invention to identify failed components of an industrial communication network without reverting to a dedicated communication protocol. It is a further objective of the invention to identify failed passive components without the need for additional devices supervising the latter. These objectives are achieved by a method of as well as a computer program and system for monitoring an industrial communication network.

According to the invention, a limited number of all the communication paths constituting the communication network are supervised, wherein each of the supervised paths includes a distinct set of network components and is delimited by two end-devices. A failure status or operating status of each communication path is determined and reported. Any network component that is part of an operating path is itself regarded as operating, i.e. failure-free, whereas all other network components are considered as non-operating or potentially failed. If there is more than one non-operating component, additional suitable communication paths are evaluated, until one single failed network component is identified and subsequently reported as requiring repair or replacement. The invention is particularly applicable in cases where some of the network components, i.e. the lines or some nodes of the communication paths, are passive components or non-intelligent devices that are unable to report an operating status themselves.

In a first embodiment of the invention, one of the two end-devices of each path is a supervising Intelligent Electronic Device (IED) that is in charge of determining the operating status of the path. In order to avoid pollution of the network or the implementation of a specific protocol, regular network data traffic is evaluated for this purpose, e.g. by considering the path in operation as long as messages from the supervised end of the path are received by the supervising IED.

The supervising IEDs do report the operating status of the supervised path to a monitoring IED that can itself be a supervising IED. Advantageously, the supervising IED communicates with the monitoring IED via a back-up or bypass communication channel excluding any of the abovementioned interconnecting network components. The separate communication channel is needed only between the supervising and monitoring IEDs, and can be a direct serial connection, a cheap network operating at a much lower bit rate than e.g. the abovementioned Ethernet communication paths between all IEDs, or another, already existing station level network.

In a further embodiment, redundancy in the communication network is provided, i.e. some of its components, or even the entire network, are duplicated. A non-operating status of a communication path is then reported via the redundant components. This prevents an end-device that is located at a remote end of a path from being isolated and unable to communicate its observations, i.e. the information about the status of the communication paths ending there. It is exactly this type of information that a monitoring IED would require to complete its view of the network and identify the broken component.

The invention is most beneficially applied to communication networks of substation automation systems, as the latter rely on a high availability and thus a minimized time without operational redundancy. In addition, novel communication networks for SA systems may comprise optical star-type coupler working exclusively on a physical level with electro-optical conversion, as well as hubs, that are passive components deprived of any intelligence or programmability. The supervising IEDs in this case are generally assigned to the station level, whereas the supervised end-devices at the other end of the communication paths are assigned to a hierarchically lower level. However, if a second, redundant communication network exists, the supervising IEDs are preferably assigned to the process-level, while an IED from the station level takes the role of the monitoring IED.

The invention is applicable to any communication network or part thereof which can be unambiguously represented as a superposition of, or decomposed into, a plurality of end-to-end communication paths between end-devices or application-level IEDs. In other words, only one path must exist between any two end devices, as is the case e.g. for star-type or tree-type networks and contrary to e.g. a ring-type topology. Although the application-level IEDs may be connected via second physical ports to a second communication network, the considerations above apply exclusively to one network, and a second communication network is at most included for the redundancy or back-up purposes mentioned. A further limitation concerns the fact that a failure of a communication node with only two lines obviously cannot be distinguished from a failure of one of the two lines. Likewise, if a communication node is out of order, a failure of any line ending at that node cannot be distinguished from a failure of the node. In this case, as from experience the node is the most probable source of errors, the failure is attributed to the node rather than to the line.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figures 1, 2:
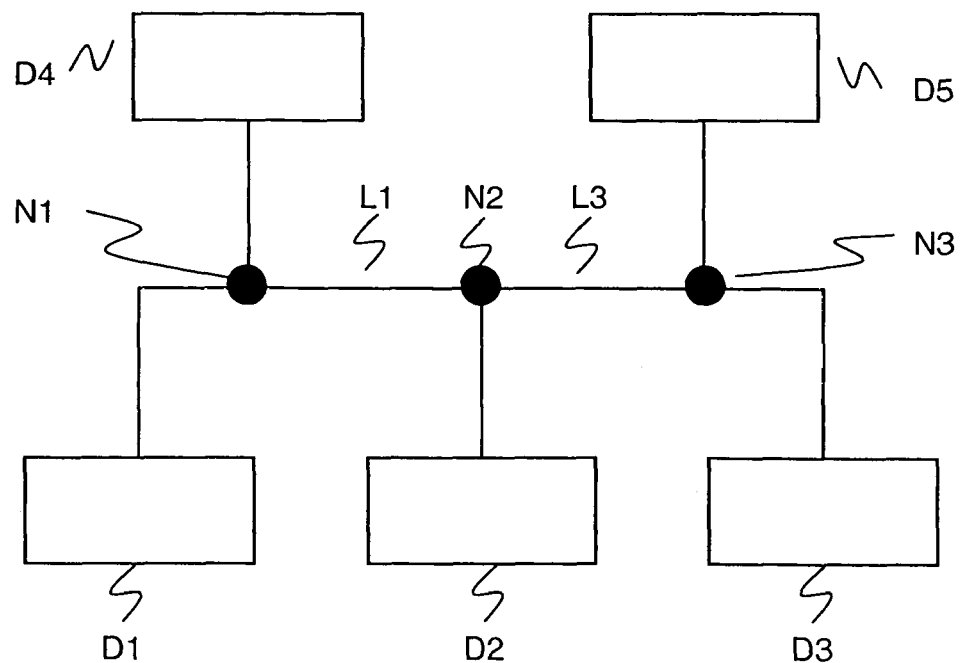
FIG. 1 shows a communication network.
FIG. 2 depicts a communication table for the network of FIG. 1.

FIG. 1 shows a communication network with five Intelligent Electronic Devices (IED) D1-D5, three nodes N1-N3 and two lines L1, L3 as its constituting components. The network depicted can be made at least part-redundant by doubling some or all of its components. A plurality of communication paths are defined between respective two of the IEDs D1-D5 acting as end devices. For each communication path defined, one of the end devices is assigned to role of supervising IED for monitoring the status of the path, while the other end device is a supervised IED. An end device in the network depicted may well be a node of a more complex network, which in turn can be regarded as a superposition of a number of smaller networks and the topology of which may itself not be amenable to the end-to-end monitoring of communication paths according to the invention.

In the exemplary case of a Substation Automation (SA) system, IEDs D1-D3 are Bay Units (BU) for protection and control at the bay level, whereas IEDs D4, D5 are station level IEDs such as Human-Machine-Interface (HMI) or a Gateway (GW) to a Network Control Centre. The nodes N1-N3 in this case are Ethernet switches or hubs. Likewise, IEDs D4, D5 may be a Bay Protection Unit and a Bay Control Unit, with the IEDs D1-D3 being one of a merging Unit (MU) as source of current and/or voltage according to IEC 61850, a breaker IED representing a breaker as a primary device, or any other process level IED.

As pointed out above, the invention is applicable to any communication network or part thereof which can be unambiguously represented as a superposition of, or decomposed into, a plurality of end-to-end communication paths between two IEDs. In other words, only one path must exist between any two end devices, as is the case e.g. for star-type or tree-type networks. Generally however, no distinction between an end device and the line or section of the network connecting said end device to the nearest node can be made, i.e. failure can only be diagnosed for the pair consisting of the end device and the corresponding end line.

The information about a status of a path is reported to a monitoring centre that is aware of the structure of the communication network and able to evaluate the totality of operating/non-operating status. Two possible ways of evaluation are detailed in the following.

In a first embodiment, the topology of the communication network according to FIG. 1 is stored in the form of a table as depicted in FIG. 2. Each end-to-end path between two end devices is assigned a row of the table, whereas each of the components is assigned a column. Every component that is part of a particular path is flagged accordingly in the field at the intersection between its column and the row of said path, as indicated by the grey background colour in FIG. 2. In the example shown, only the nodes N1-N3 and the lines L1, L3 are included, i.e. the aforementioned pairs consisting of an end device and the corresponding end line are omitted. For instance, the path D1-D4 and the path D2-D5 cover all the nodes and both lines.

For each path that is being monitored, the supervising IED reports a health status to a monitoring or evaluating IED, i.e. whether the path is OK or not. All flagged fields of the corresponding row in the table are marked with a "+" sign for a healthy path and with a "−" sign for failed paths. The health status of the individual components is calculated as an "OR" function across the columns, i.e. any component with at least one "+" mark is itself considered healthy. In the example of FIG. 2, the line L1 is actually identified as the failed component. Due to the symmetry of the topology of the network in FIG. 1, it takes some additional logical considerations as well as the assumption that only one component has failed in order to identify node N2 in case of failure. The number of paths to be monitored and reported in the table has to be chosen depending on the particular topology, for instance, in the table of FIG. 2, the paths D1-D5 and D2-D4 actually do not provide any additional information and could be omitted.

The resulting information with the indication of the identified failed component is finally sent to a maintenance centre and/or depicted to an operator on a schematical representation of the communication network. Likewise, the information from the supervising IEDs can be traced directly on such a representation or on a screen by marking all components along a healthy path themselves as healthy, without involving a table.

LIST OF DESIGNATIONS

D1-D5 Intelligent Electronic Devices
N1-N3 Nodes
L1, L3 Lines

The invention claimed is:

1. A method of monitoring an industrial communication network comprising interconnected end-devices and interconnecting network components, wherein between each pair of end-devices, exactly one communication path including at least one network component is defined, wherein the method comprises
   a) determining, for each communication path of a set comprising a limited number of distinct communication paths interconnecting two end-devices, if the communication path is operating or non-operating,
   b) considering each network component that is not included in at least one operating communication path of the set of communication paths as a non-operating network component,
   c) identifying a single network component among the interconnecting network components as a failed network component if the single network component is considered to be the only non-operating network component of the set, and
   d) enlarging the set of distinct communication paths by adding at least one further communication path to the set, each added communication path interconnecting a further pair of end-devices, and repeating steps a), b), and c), if more than one network component of the set is considered to be non-operating.

2. The method according to claim 1, wherein step a) further comprises
   defining one of the two end-devices of each pair of end-devices to be the supervising end-device of the respective communication path, and determining, by the supervising end-device, an operating status of the respective communication path by evaluating regular data traffic.

3. The method according to claim 2, wherein the communication network comprises a back-up communication channel connecting supervising end-devices to a monitoring end-device, wherein step a) further comprises
   reporting, by the supervising end-device, the operating status to the monitoring end-device for execution of step b) and for identification of the single non-operating network component.

4. The method according to claim 1, wherein the communication network comprises redundant components, and step a) comprises
   reporting an operating status of at least one of the communication paths by a respective one of the end-devices of the at least one of the communication paths via the redundant network components.

5. The method according to claim 1, wherein the communication network is part of a substation automation system.

6. The method according to claim 1, wherein at least one of the network components is a passive device.

7. A computer readable recording medium having a computer program stored thereon for monitoring an industrial communication network, said program being loadable in and executable by a data processing unit and causing the data processing unit to perform, when being executed by the data processing unit, the method according to claim 1.

8. The method according to claim 4, wherein the communication network is part of a substation automation system.

9. The method according to claim 8, wherein at least one of the network components is a passive device.

10. The method according to claim 3, wherein the communication network is part of a substation automation system.

11. The method according to claim 3, wherein at least one of the network components is a passive device.

12. A system for monitoring an industrial communication network comprising interconnected end-devices and interconnecting network components, wherein between each pair of end-devices, exactly one communication path including at least one network component is defined, wherein the system comprises:
   a) supervising end-devices for determining, for each communication path of a set comprising a limited number of distinct communication paths interconnecting the supervising end-devices to supervised end-devices, if the communication path is operating or non-operating, and
   b) a monitoring end-device for considering each network component that is not included in at least one operating communication path of the set of communication paths as a non-operating network component and for repeatedly enlarging the set of distinct communication paths by adding further communication paths until a single network component is considered non-operating.

13. A method of monitoring an industrial communication network having interconnected end-devices and interconnecting network components configured with a pair of end-devices, wherein exactly one communication path including at least one network component is located between the end-devices of the pair, and wherein the method comprises:
   a) determining whether each communication path of a set of communication paths interconnecting the two end-devices is operating;

b) considering a network component that is not included in at least one operating communication path of the set of communication paths as a non-operating network component; and c) enlarging the set of communication paths by adding communication paths to the set and repeating steps a) and b), the enlarging and repeating being performed until a single non-operating network component is identified.

14. A system for monitoring an industrial communication network having interconnected end-devices and interconnecting network components, configured with a pair of end-devices, wherein exactly one communication path including at least one network component is located between the end-devices of the pair, and wherein the system comprises:

a) supervising end-devices for determining whether each communication path of a set comprising a limited number of communication paths interconnecting the supervising end-devices to supervised end-devices is operating; and b) a monitoring end-device for considering each network component that is not included in at least one operating communication path of the set of communication paths as a non-operating network component and for repeatedly enlarging the set of distinct communication paths by adding further communication paths until a single network component is considered non-operating.

* * * * *